No. 865,739. PATENTED SEPT. 10, 1907.
T. B. WILLIAMS.
MACHINE FOR FACING VALVES, &c.
APPLICATION FILED JULY 7, 1905.
2 SHEETS—SHEET 2.
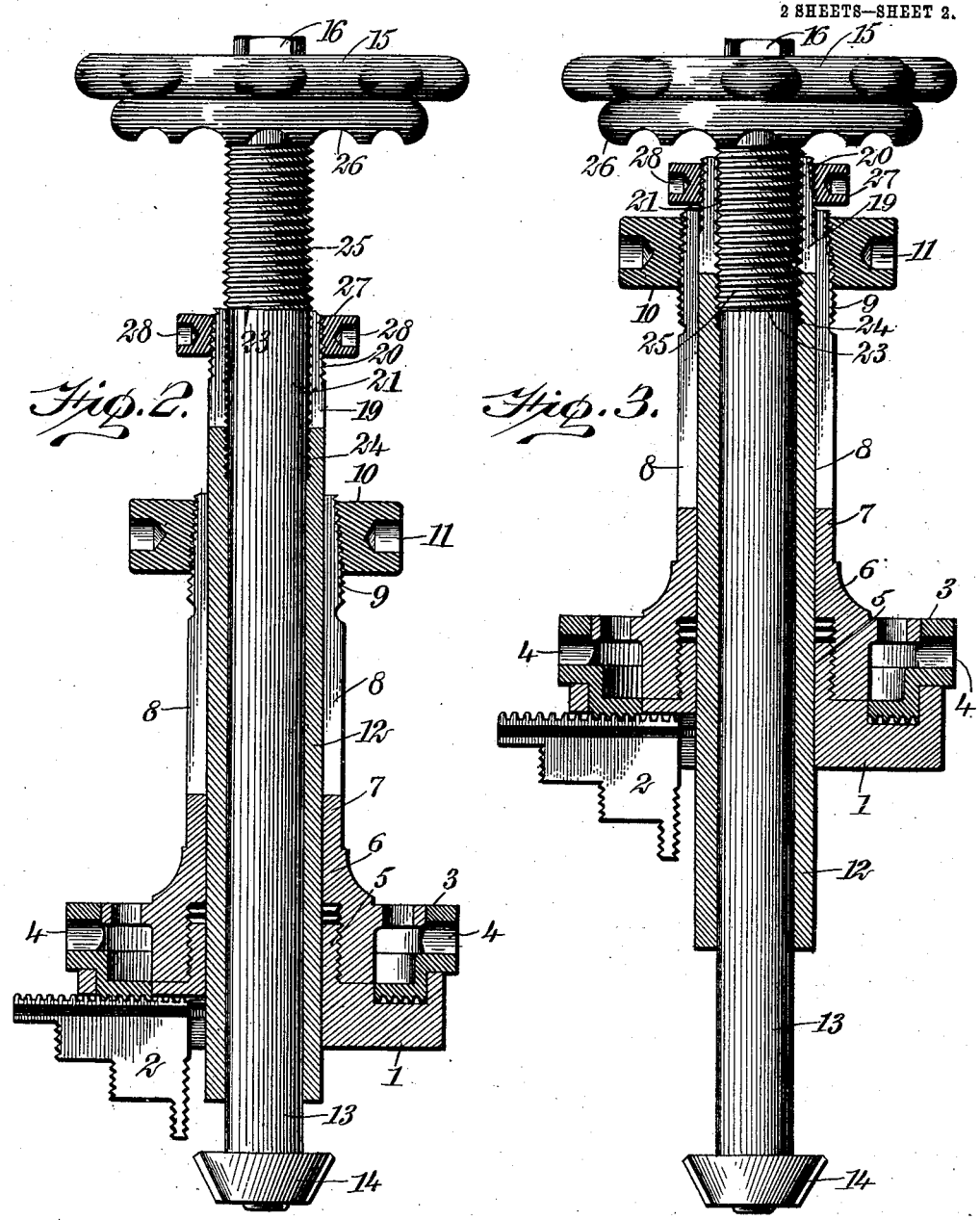
WITNESSES:
H. G. Dieterich
E. E. Ellis
INVENTOR
Thomas B. Williams
BY
ATTORNEYS

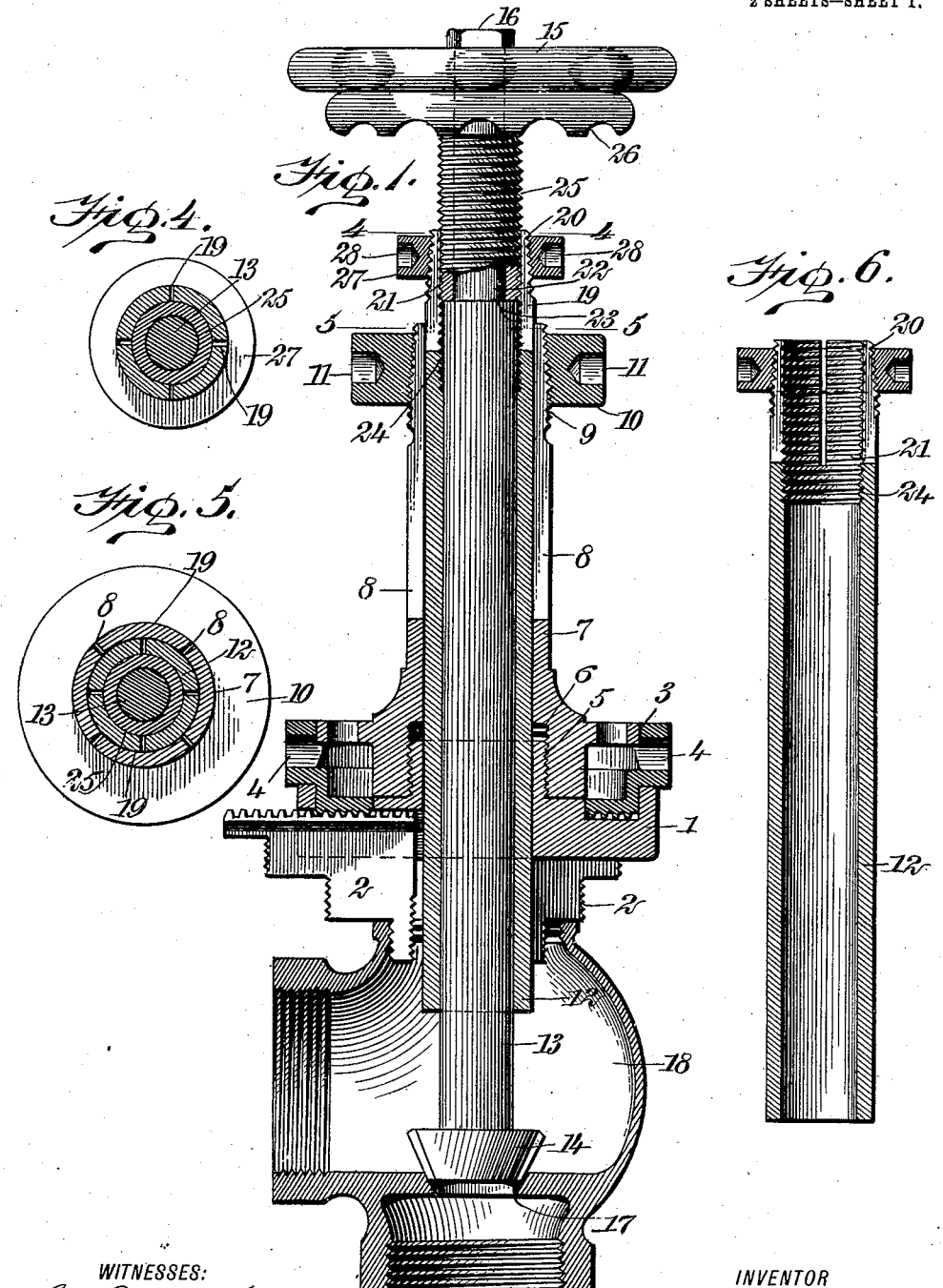

UNITED STATES PATENT OFFICE.

THOMAS B. WILLIAMS, OF ORANGE, MASSACHUSETTS, ASSIGNOR TO THE LEAVITT MACHINE CO., OF ORANGE, MASSACHUSETTS.

MACHINE FOR FACING VALVES, &c.

No. 865,739.  Specification of Letters Patent.  Patented Sept. 10, 1907.

Application filed July 7, 1905. Serial No. 268,656.

*To all whom it may concern:*

Be it known that I, THOMAS B. WILLIAMS, a citizen of the United States, and a resident of Orange, in the county of Franklin and State of Massachusetts, have invented a new and Improved Machine for Facing Valves, &c., of which the following is a full, clear, and exact description.

This invention relates to cutting devices, and it consists substantially in the details of construction and combinations of parts hereinafter more particularly described and pointed out in the claims.

The invention has reference more especially to hand-operated rotatable cutting devices, such, for instance, as are employed for dressing or re-surfacing the seats of valves, faucets, and the like, and a type of which is illustrated and described in Letters Patent No. 429,939, granted to Charles L. Morse on the 10th day of June, 1890.

One of the principal objects of the invention is to provide a rotary cutting device of the type referred to, of an embodiment to overcome certain disadvantages and objections frequently encountered in the use of other structures hitherto devised with like ends in view.

A further object is to provide a device of this kind which is simple in construction and comparatively inexpensive to manufacture, besides being thoroughly effective and reliable for its purposes and possessing the capacity for long and repeated service.

The above and additional objects are attained by means substantially such as are illustrated in the accompanying drawings forming a part of this specification, in which similar characters of reference indicate corresponding parts in all the views.

Figure 1 is a vertical section view of my improved rotary cutting device, showing the same as applied to position within a valve-casing for the purpose of effecting the dressing or repair of a valve-seat therein; Fig. 2 is a similar view, minus the valve-casing, indicating the rotatable spindle nearly at the inner limit of its longitudinal adjustment; Fig. 3 is a similar view to Fig. 2, indicating the rotatable spindle practically at the outer limit of its longitudinal adjustment; Fig. 4 is a transverse sectional view on the line 4—4 of Fig. 1; Fig. 5 is a similar view, on the line 5—5 of Fig. 1; and Fig. 6 is a sectional view of the bearing-sleeve for the spindle, detached, together with the feed-regulating member thereon.

In devices of this general character as at present employed in many instances, the rotatable spindle included therein very often becomes so bent or distorted in use that the entire device is rendered practically inoperative for its purposes, due principally to the inadequacy of bearing support for the spindle; and another objection frequently encountered is the length of time required to adjust the spindle longitudinally for appreciable proportions of its length, as is frequently necessary to do when employing the device in the repair of structures ordinarily designated as "deep seated", as a valve-casing, for instance, located considerably within the engine or other structure on which employed.

With the use of my device, the above-mentioned disadvantages and objections are entirely overcome, and before proceeding with a more detailed description thereof, it maybe stated that in the embodiment of the same herein shown, I employ a chuck of ordinary form, combined with which are the usual radially adjustable jaws, and a rotatable disk or ring for operating the jaws in a well-known manner. Rigid with the chuck is a tubular member of special construction, within which works a specially-constructed rotatable spindle, having, at one end thereof, a cutting-tool, and at its other end, a handle or hand-wheel for operating the same to effect the dressing or repair of a valve-seat by means of said cutting-tool.

Special means are employed for affording a bearing support for the spindle for practically its entire length; and further special means are employed by which to quickly effect longitudinal adjustments of said spindle to any desired extent without the necessity of rotating the same for that purpose, (and entirely independently of the ordinary feed device therefor) as is now necessary in most instances.

While I have herein represented my improvements in a certain preferred embodiment, it will be understood, of course, that I am not limited thereto in precise detail, since immaterial changes therein may be made coming within the scope of my invention.

Reference being had to the drawings by the designating characters thereon, 1 represents a chuck, associated with which are the radially-disposed jaws 2 and a ring or disk 3 for adjusting the said jaws either inwardly or outwardly, in a manner well understood; said disk being provided, at intervals of the circumference thereof, with openings or recesses 4 for the insertion of a wrench or rod (not shown) to effect the turning thereof.

The chuck is provided, on the inner face thereof, with an externally screw-threaded flange 5, to which is secured the internally threaded enlarged portion 6 of a tubular member 7, which is split at 8 longitudinally for a suitable proportion of its length at different points in the diameter of said member (see Figs. 1, 2 and 3). Said tubular member is externally screw-threaded, at 9, for a suitable distance from the free end thereof, and screwing thereupon is an internally threaded ring 10, having, at intervals of the circumference thereof, suitable openings or recesses 11 for the insertion therein of a rod or other implement for effecting the turning of the ring, as will be understood.

Located within the tubular member 7, and being of a length to extend somewhat beyond the end of the same at one end, as well as beyond the operative face of the chuck at the other, is a bearing-sleeve 12 for a rotatable spindle 13, having, at one end thereof, a cutting-tool 14, and at its other end a handle or hand-wheel 15 secured thereto by means of a nut 16, or in any other suitable way, for imparting the necessary movements to the spindle in the operations of the device.

As indicated in Fig. 1, the device is shown as employed for the purpose of effecting the repair or resurfacing of the seat 17 for an ordinary globe-valve (not shown), located within a valve-casing 18 in a manner well understood. The said bearing-sleeve 12 is split circumferentially at different points for a suitable distance from the upper end thereof, as indicated at 19, and the same is screw-threaded externally, at 20, for a suitable distance from such end, as well as internally, at 21, for another suitable distance. The rotatable spindle 13 is reduced in diameter, at 22, thus to provide an annular shoulder 23, and the internal thread of the split portion of the bearing-sleeve 12 extends for a suitable extent within the latter, as indicated at 24. Fitting upon the reduced portion of the spindle is an externally threaded sleeve 25, provided, at the upper end thereof, with a handle or hand-wheel 26 for enabling the sleeve to be manipulated or turned simultaneously with the turning of the hereinbefore-mentioned handle or hand-wheel 15; and it will be noted that the said externally threaded sleeve 25 works within the said internally threaded portion of the bearing-sleeve 12. Screwing upon the said externally threaded portion of the bearing-sleeve 12 is a smaller ring 27, also having, in the periphery thereof, suitably disposed openings or recesses 28 for receiving a tool or other implement to turn the ring. This ring, taken together with the externally threaded sleeve 25 and the internally and externally threaded portion of the bearing-sleeve 12, constitute practically a feed device for the spindle by which the cutting-tool is held against its work; and it will be seen that by grasping both the handles or hand-wheels 15 and 26 and turning them together, the rotatable spindle will be urged forwardly, in a manner well understood; and it will be noted that the exterior surface of the hereinbefore-mentioned externally threaded portion of the bearing-sleeve is slightly tapered, so that the farther the ring 27 is screwed down upon the said portion of the bearing-sleeve, the greater will be the friction between the same and the sleeve 25 and consequently the less freely will the feed of the rotatable spindle take place.

The split end of the bearing 12 and the ring 27 constitute the adjusting means for the spindle, whereby it may be moved into contact with the work or withdrawn therefrom without the necessity of making use of the feed connection. By loosening the ring, the spindle may be moved longitudinally of the bearing.

The externally threaded surface of the upper portion of the said tubular member 7 of the structure is also slightly tapered, so that it will be seen that by proper adjustment of the said ring 10 thereon, the bearing-sleeve 12 may be secured more or less tightly within the tubular member by frictional contact therewith of the split portions of said member.

From the foregoing it will be seen that an effective bearing is provided for practically the full length of the rotatable spindle, and also that whenever it is desired to adjust said spindle longitudinally, it is simply necessary to partially unscrew the ring 10 from the longitudinally split portion of the tubular member 7, the said ring 27 being in like manner partially turned so as to disengage the split portions of the bearing-sleeve from the externally threaded sleeve 25, whereupon the desired adjustment can be effected by simply exerting the desired force upon the rotatable spindle in one direction or the other, accordingly as may be required. At this time, also the bearing-sleeve 12 may be moved correspondingly within the tubular member 7, and upon the said spindle; or if the desired adjustment of the spindle is for a short proportion of its length only, then the said bearing-sleeve may be permitted to remain practically in the same position within the said tubular member 7. It is apparent that the spindle 13 may be rotated independently of the feed device for the structure by grasping and manipulating the handle or hand-wheel 15 only, whereas whenever it is desired to effect any amount of feed for the cutting-tool, this can be readily accomplished by turning both the handles or hand-wheels simultaneously, as has already been explained.

In Fig. 1 the rotatable spindle 13 is shown as adjusted to one position within the bearing-sleeve therefor, while in Fig. 2 the same is shown at practically the limit of its inner adjustment, and in Fig. 3 it is shown at practically the limit of its outward adjustment, the positions of the parts of the structure coöperating to enable these adjustments to be effected, being correspondingly indicated in the several figures mentioned.

Having thus described my invention, I claim as new and desire to secure by Letters Patent:—

1. A machine for facing valves, etc., embodying clamping means for engaging a valve-casing, a rotatable spindle having a cutter extending beyond the clamping means, a bearing surrounding the spindle and supporting said spindle near both ends thereof and carried and supported by said clamping means and having a cylindrical external journal surface, and means for fastening said bearing in a stationary position during the advance of the spindle.

2. A machine for facing valves, etc., embodying clamping means for engaging a valve-casing said clamping means having a split tubular member, a rotatable spindle having a cutter extending beyond the clamping means, a long bearing sleeve surrounding the spindle and supporting said spindle near both ends thereof and carried and supported in said tubular member, and means for clamping the split portion of the tubular member upon the bearing sleeve to hold said bearing sleeve in a stationary position during the advance of the spindle.

3. A machine for facing valves, etc., embodying clamping means for engaging a valve-casing, a rotatable spindle having a cutter extending beyond the clamping means, a bearing between the spindle and the clamping means and extending to a point adjacent to the cutter and having an external journal surface, and a feed connection between said bearing and spindle.

4. A machine for facing valves, etc. embodying clamping means for engaging a valve-casing, a rotatable spindle having a cutter and extending beyond the clamping means, a long bearing sleeve surrounding the spindle and supporting said spindle near both ends thereof and carried and supported by said clamping means and having an external journal surface, a feed connection between said bearing sleeve and spindle, and means for fastening said bearing sleeve in a stationary position during the advance of the spindle.

5. A machine for facing valves, etc. embodying clamping means for engaging a valve casing, a rotatable spindle having a cutter and extending beyond the clamping means, and a bearing surrounding the spindle and supporting said spindle near both ends thereof and carried and supported by said clamping means and having an external journal surface and slidable longitudinally of the axis of the spindle.

6. A machine for facing valves, etc. embodying clamping means for engaging a valve-casing, a rotatable spindle having a cutter and extending beyond the clamping means, and a bearing surrounding the spindle and supporting said spindle near both ends thereof and carried and supported by said clamping means and connected to slide in unison with the spindle in the direction of the axis of said feed-spindle.

7. A machine for facing valves, etc. embodying a chuck, a tubular member rigid therewith at one end and split and externally threaded a suitable distance from its free end, a rotatable spindle extending beyond the chuck, a bearing sleeve for the spindle between the latter and the tubular member and extending to a point adjacent to the end of the spindle to steady the same, said bearing sleeve being also split and externally threaded and tapered a suitable distance from the end thereof, internally-threaded rings on the threaded portions of said tubular member and the bearing-sleeve, and a feed connection between said bearing-sleeve and spindle.

In testimony whereof I have signed my name to this specification in the presence of two subscribing witnesses.

THOMAS B. WILLIAMS.

Witnesses:
　FRED A. DEXTER,
　EDWARD J. WOOD.